(12) United States Patent
Kim

(10) Patent No.: US 10,690,080 B2
(45) Date of Patent: Jun. 23, 2020

(54) METHOD OF DIAGNOSING FAULT OF TIMER FOR MONITORING ENGINE OFF TIME

(71) Applicants: Hyundai Motor Company, Seoul (KR); Kia Motors Corporation, Seoul (KR)

(72) Inventor: Seung Bum Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 389 days.

(21) Appl. No.: 15/829,897

(22) Filed: Dec. 2, 2017

(65) Prior Publication Data

US 2019/0078527 A1    Mar. 14, 2019

(30) Foreign Application Priority Data

Sep. 12, 2017 (KR) .................. 10-2017-0116439

(51) Int. Cl.

| | |
|---|---|
| *F02D 41/22* | (2006.01) |
| *G01L 19/00* | (2006.01) |
| *F02D 41/04* | (2006.01) |
| *G01K 3/08* | (2006.01) |
| *G01K 13/02* | (2006.01) |
| *G01K 1/02* | (2006.01) |
| *F02D 41/24* | (2006.01) |

(52) U.S. Cl.
CPC .......... *F02D 41/22* (2013.01); *F02D 41/042* (2013.01); *F02D 41/2403* (2013.01); *G01K 1/026* (2013.01); *G01K 3/08* (2013.01); *G01K 13/02* (2013.01); *G01L 19/0092* (2013.01); *F02D 2041/228* (2013.01); *F02D 2200/021* (2013.01); *G01K 2205/00* (2013.01)

(58) Field of Classification Search
CPC ........ F02D 1/22; F02D 41/42; F02D 41/2403; G01K 1/026; G01K 13/02; G01L 19/0092
USPC ....................................................... 701/34.4
See application file for complete search history.

(56) References Cited

U.S. PATENT DOCUMENTS

| | | | |
|---|---|---|---|
| 2003/0023367 A1* | 1/2003 | Avery, Jr. ................ | F01N 3/023 701/110 |
| 2004/0133318 A1* | 7/2004 | Kang ...................... | F16H 61/12 701/33.9 |
| 2011/0106392 A1* | 5/2011 | Verner .................... | F01N 3/101 701/101 |
| 2013/0006453 A1* | 1/2013 | Wang ................ | B60W 50/0205 701/22 |

(Continued)

FOREIGN PATENT DOCUMENTS

| | | |
|---|---|---|
| JP | 3870974 B2 | 1/2007 |
| JP | 5223630 B2 | 6/2013 |

(Continued)

*Primary Examiner* — Thomas G Black
*Assistant Examiner* — Wae L Louie
(74) *Attorney, Agent, or Firm* — Mintz Levin Cohn Ferris Glovsky and Popeo, P.C.; Peter F. Corless

(57) ABSTRACT

A method of diagnosing a fault of a timer for monitoring an engine off time is capable of accurately determining whether a timer that monitors an engine off time between a previous start off time and a next start on time of an engine has an error by using an engine coolant temperature, an engine oil temperature, a fuel tank pressure, a fuel tank temperature, and an outside air temperature.

10 Claims, 3 Drawing Sheets

(56) References Cited

U.S. PATENT DOCUMENTS

| | | | | |
|---|---|---|---|---|
| 2013/0151131 A1* | 6/2013 | Laszlo | ................... | F02D 28/00 |
| | | | | 701/113 |
| 2016/0071332 A1* | 3/2016 | MacFarlane | ........... | B60K 35/00 |
| | | | | 701/29.1 |
| 2019/0078527 A1* | 3/2019 | Kim | ........................ | F02D 41/22 |

FOREIGN PATENT DOCUMENTS

| JP | 5778536 B2 | 9/2015 |
|---|---|---|
| KR | 10-0726595 B1 | 6/2007 |
| KR | 10-2010-0035416 A | 8/2010 |

* cited by examiner

METHOD OF DIAGNOSING FAULT OF TIMER FOR MONITORING ENGINE OFF TIME

CROSS-REFERENCE TO RELATED APPLICATION

This application claims under 35 U.S.C. § 119(a) the benefit of Korean Patent Application No. 10-2017-0116439 filed Sep. 12, 2017, the entire contents of which are incorporated herein by reference.

BACKGROUND

(a) Technical Field

The present disclosure relates to a method of diagnosing a fault of a timer for monitoring an engine off time, more particularly, to a method of monitoring an engine off time, which is capable of determining an error of a timer that monitors the engine off time between a previous start off time and a next start on time.

(b) Description of the Related Art

An engine off time refers to a time between a previous start off time and a next start on time, and is utilized as data for optimal heating control for removing emission of a catalyst mounted in an exhaust system, engine electronic control for improving fuel efficiency, and the like.

The engine off time is monitored by an engine control unit (ECU) when an engine starts off (key off).

Even when an engine starts off, the engine control unit ECU maintains a power latch section (i.e., a time for checking information about a vehicle in general, such as storing various sensor values) without being off for a predetermined time, so that the engine control unit ECU monitors an engine off time in the power latch section.

Referring to FIG. 1, the engine off time is monitored by a calculating unit CPU and a timer TIMER included in the engine control unit ECU.

More particularly, the monitoring of an engine off time by the electronic control unit ECU includes calculating, by the calculating unit CPU, an engine off time by a predetermined method, counting, by the timer TIMER, the engine off time, and comparing the engine off time calculated by the calculating unit with the engine off time counted by the timer, and reliability of an engine off time counter transmitted by the timer is diagnosed through the comparison.

As a result of the monitoring of the engine off time, as can be seen in FIG. 2, when a difference A between the engine off time calculated by the calculating unit and the engine off time counted by the timer is within a predetermined range, it is determined that the engine off time counter transmitted by the timer has reliability, and then, the CPU receives the counter of the engine off time transmitted from the timer during the engine start on (key on) and uses the counter as engine off time data.

However, as described above, the monitoring of the engine off time is simply performed for a while in the power latch section in the state where the CPU is on, and after the reliability of the engine off time counter of the timer is acknowledged, it is impossible to check whether the timer is properly operated in the off state of the CPU.

In this respect, a counter error of the timer may possibly be continuously piled as the engine off time increases, so that there is a demand for separate monitoring of a proper operation of the timer in an actual off state of the CPU (for example, the law authentication requirements of California Air Resource Board (CARB) in North America).

The above information disclosed in this Background section is only for enhancement of understanding of the background of the disclosure and therefore it may contain information that does not form the prior art that is already known in this country to a person of ordinary skill in the art.

SUMMARY

The present disclosure provides a method of diagnosing a fault of a timer for monitoring an engine off time, which is capable of accurately determining whether a timer that monitors an engine off time between a previous start off time and a next start on time of an engine has an error by using a coolant temperature and an oil temperature of the engine, pressure and a temperature of a fuel tank, an outside air temperature, and the like.

In one aspect, the present disclosure provides a method of diagnosing a fault of a timer for monitoring an engine off time, the method including: i) initiating, by a timer of an electronic control unit, monitoring of an engine off time when an engine starts off; ii) storing first data including a fuel tank pressure, a fuel tank temperature, and an outside air temperature including an engine coolant temperature and an engine oil temperature at an initiation time of the monitoring of the engine off time in the electronic control unit; iii) terminating the monitoring of the engine off time by the timer when the engine starts on, and providing the monitored engine off time to a calculating unit of the electronic control unit ECU; iv) checking, by the electronic control unit ECU, second data including a fuel tank pressure, a fuel tank temperature, and an outside air temperature including an engine coolant temperature and an engine oil temperature at a termination time of the monitoring of the engine off time; and v) comparing the first data stored in operation ii) with the second data checked in operation iv) according to the engine off time provided in operation iii), and determining whether the engine off time of the timer provided in operation iii) has an error.

In another aspect, the present disclosure provides a non-transitory computer readable medium containing program instructions executed by a processor, the computer readable medium including: program instructions that initiate monitoring of an engine off time when an engine starts off, program instructions that store first data including a fuel tank pressure, a fuel tank temperature, and an outside air temperature including an engine coolant temperature and an engine oil temperature at an initiation time of the monitoring of the engine off time in an electronic control unit; program instructions that terminate the monitoring of the engine off time when the engine starts on, and provide the monitored engine off time to a calculating unit of the electronic control unit; program instructions that check second data including a fuel tank pressure, a fuel tank temperature, and an outside air temperature including an engine coolant temperature and an engine oil temperature at a termination time of the monitoring of the engine off time; and program instructions that compare the first data with the second data according to the engine off time, and determine whether the engine off time has an error.

The present disclosure provides the effects described below.

First, it is possible to accurately determine whether a timer that monitors an engine off time between a previous start off time and a next start on time of an engine has an error by using an engine coolant temperature, an engine oil temperature, a fuel tank pressure, a fuel tank temperature, an outside air temperature, and the like, and it is possible to induce the timer included in the electronic control unit ECU to be replaced through a separate warning (for example, a warning light) when the error is generated.

Second, it is possible to satisfy the law authentication requirements of California Air Resource Board (CARB) in North America, requiring to separately monitor whether the timer is properly operated in an actual off state of the electronic control unit ECU.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein.

Figure 1:
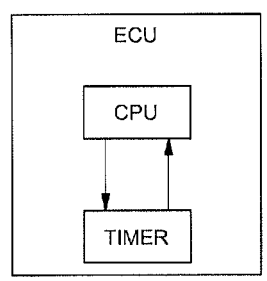
FIG. 1 is a schematic diagram illustrating a configuration of an electronic control unit that monitors an engine off time.
Figure 2:
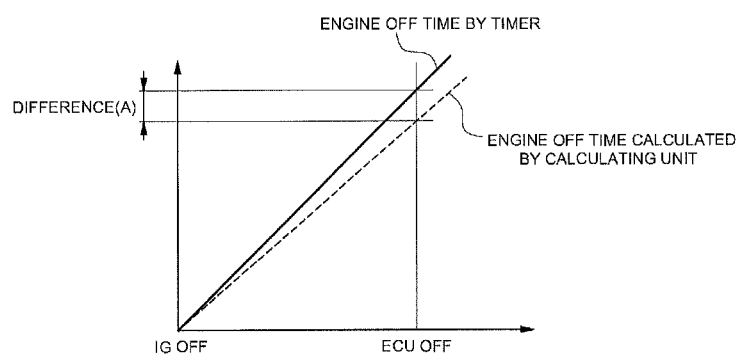
FIG. 2 is a graph illustrating a method of monitoring an engine off time.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, an exemplary embodiment of the present disclosure will be described in detail with reference to the accompanying drawings.

Figure 5:
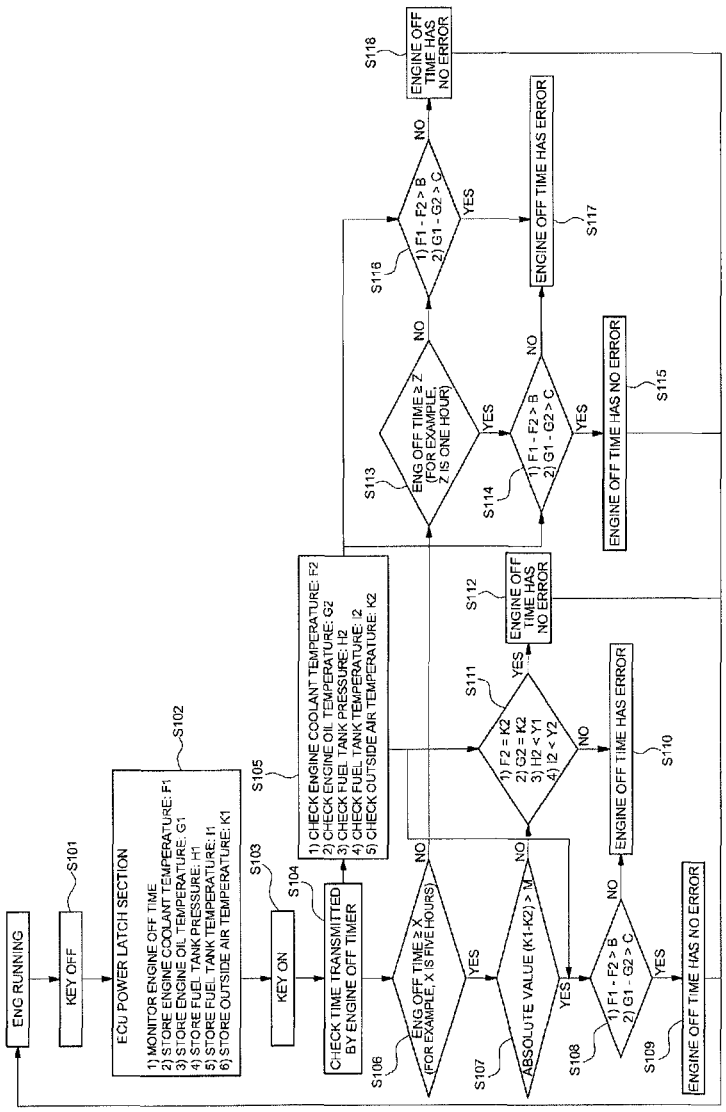
FIG. 5 is a flowchart illustrating a method of diagnosing a fault of a timer for monitoring an engine off time according to the present disclosure.

Referring to FIG. 5 illustrating a method of diagnosing a fault of a timer for monitoring an engine off time according to the present disclosure, first, when an engine starts off (key off) (S101), an electronic control unit (ECU) maintains a power latch section (a time for checking information about a vehicle in general, such as storing various sensor values) without being off for a predetermined time, and initiates monitoring of an engine off time in the power latch section (S102).

In this case, the monitoring of the engine off time is performed by counting, by a timer included in the electronic control unit ECU, an engine off time by next engine start on.

First data including a fuel tank pressure H1, a fuel tank temperature I1, an outside air temperature K1, and the like, including an engine coolant temperature F1 and an engine oil temperature G1 at an initiation time of the monitoring of the engine off time is stored in the electronic control unit ECU.

For example, at the initiation time of the monitoring of the engine off time, a sensing signal of a temperature sensor detecting the engine coolant temperature F1, a sensing signal of a temperature sensor detecting the engine oil temperature G1, a sensing signal of a pressure sensor detecting the fuel tank pressure H1, a sensing signal of a temperature sensor detecting the fuel tank temperature I1, and a sensing signal of a temperature sensor detecting the outside air temperature K1 are input to and stored in the electronic control unit ECU.

Subsequently, when the engine starts on (key on) again (S103), the monitoring of the engine off time by the timer is terminated, and the engine off time, that is, the engine off time between a previous start off time and a next start on time of the engine, monitored by the timer is provided to a calculating unit of the electronic control unit ECU (S104).

Subsequently, the electronic control unit ECU checks second data including a fuel tank pressure H2, a fuel tank temperature I2, and an outside air temperature K2, including an engine coolant temperature F2 and an engine oil temperature G2 at a termination time of the monitoring of the engine off time (S105).

For example, at the termination time of the monitoring of the engine off time, a sensing signal of a temperature sensor detecting the engine coolant temperature F2, a sensing signal of a temperature sensor detecting the engine oil temperature G2, a sensing signal of a pressure sensor detecting the fuel tank pressure H2, a sensing signal of a temperature sensor detecting the fuel tank temperature I2, and a sensing signal of a temperature sensor detecting the outside air temperature K2 are input to the electronic control unit ECU.

In the meantime, when the timer included in the electronic control unit ECU counts and monitors the engine off time between the previous start off time and the next start on time of the engine as described above, it is impossible to check whether the timer is properly operated in an off state of the electronic control unit ECU, and a counter error of the timer may possibly be continuously piled as the engine off time increases, so that there is a demand for separately diagnosing a fault for whether the timer is properly operated in an actual off state of the electronic control unit ECU.

In this respect, the timer fault diagnosis according to the present disclosure is performed by a calculating unit of the electronic control unit ECU, and is performed by comparing the first data stored in the electronic control unit ECU at the initiation time of the monitoring of the engine off time by the timer with the second data checked by the electronic control unit ECU at the termination time of the monitoring of the engine off time by the timer to determine whether the engine off time monitored by the timer has an error.

Herein, the operation of determining whether the engine off time monitored by the timer has an error will be described below.

First, the engine off time monitored by the timer is compared with a reference time.

That is, the engine off time provided to the calculating unit of the electronic control unit ECU in operation S104 is compared with an upper limit reference time X (for example, five hours) for dividing the engine off time into a long time and a short time (S106).

As a result of the comparison in operation S106, when the engine off time is equal to or longer than the upper reference time X, first, a difference between absolute values of the outside air temperature K1 stored in the electronic control unit ECU at the initiation time of the monitoring of the engine off time by the timer and the outside air temperature K2 checked by the electronic control unit ECU at the termination time of the monitoring of the engine off time by the timer is compared with a reference value M (S107).

Figure 3:
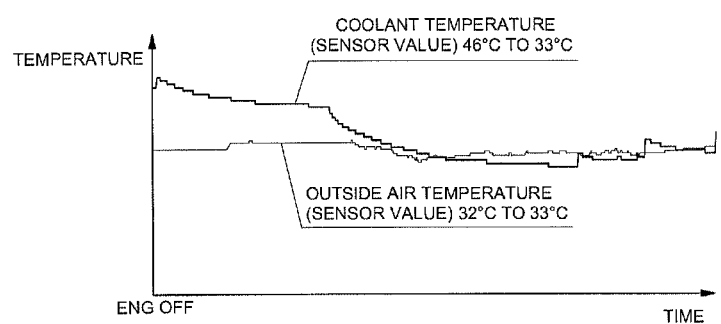
FIG. 3 is a graph illustrating the case where an engine coolant temperature is converged to an outside air temperature after engine start off.

Referring to FIG. 3, it can be seen that when the engine off time equal to or longer than the upper limit reference time X is generated, the actual engine temperature is converged to the outside air temperature based on the sufficient engine off time, and when the engine off time equal to or longer than the upper limit reference time X is not generated, the engine temperature is not converged to the outside air temperature, but the engine temperature is lower than a temperature at the time of the engine start off (key off) toward the outside air temperature, and in this case, the engine temperature may be represented with the engine coolant temperature and the engine oil temperature.

In this case, as a result of the comparison in operation S107, when the difference between the absolute values of the outside air temperature K1 and the outside air temperature K2 is larger than the reference value M, a difference between the engine coolant temperature F1 stored at the initiation time of the monitoring of the engine off time by the timer and the engine coolant temperature F2 checked at the termination time of the monitoring of the engine off time by the timer and a difference between the engine oil temperature G1 stored at the initiation time of the monitoring of the engine off time by the timer and the engine oil temperature G2 checked at the termination time of the monitoring of the engine off time by the timer are compared with a reference temperature (S108).

When the engine off time monitored by the timer is equal to or longer than the reference time X, the engine coolant temperature and the engine oil temperature are converged to the outside air temperature, so that the case where the difference between the absolute values of the outside air temperature K1 and the outside air temperature K2 is equal to or larger than the reference value means that the outside air temperature is changed, and thus, the engine coolant temperature and the engine oil temperature converged to the outside air temperature need to be changed.

In this respect, as a result of the comparison in operation S108, when a temperature obtained by subtracting the engine coolant temperature F2 at the termination time of the monitoring of the engine off time from the engine coolant temperature F1 at the initiation time of the monitoring of the engine off time is larger than a first reference temperature B, and a temperature obtained by subtracting the engine oil temperature G2 at the termination time of the monitoring of the engine off time from the engine oil temperature G1 at the initiation time of the monitoring of the engine off time is larger than a second reference temperature C, it is determined that the engine off time of the timer (the engine off time monitored by the timer) does not have an error (S109).

More particularly, when the engine off time monitored by the timer is five hours, there is a difference between absolute values of the outside air temperature K1 at a start time in five hours and the outside air temperature K2 at a termination time, and a difference between the engine coolant temperature F1 at the start time in five hours and the engine coolant temperature F2 at the termination time is larger than the first reference temperature B and a difference between the engine oil temperature G1 at the start time in five hours and the engine oil temperature G2 at the termination time is larger than the second reference temperature C, it is determined that the engine coolant temperature and the engine oil temperature converged to the changed outside air temperature are also normally changed and it is determined that the engine off time of the timer has no error.

In the meantime, as a result of the comparison in operation S108, when the temperature obtained by subtracting the engine coolant temperature F2 at the termination time of the monitoring of the engine off time from the engine coolant temperature F1 at the initiation time of the monitoring of the engine off time is smaller than the first reference temperature B, or the temperature obtained by subtracting the engine oil temperature G2 at the termination time of the monitoring of the engine off time from the engine oil temperature G1 at the initiation time of the monitoring of the engine off time is smaller than the second reference temperature C, it is determined that the engine off time of the timer has an error (S110).

More particularly, when the engine off time monitored by the timer is five hours, there is a difference between absolute values of the outside air temperature K1 at a start time in five hours and the outside air temperature K2 at a termination time, and the difference between the engine coolant temperature F1 at the start time in five hours and the engine coolant temperature P2 at the termination time is smaller than the first reference temperature B or the difference between the engine oil temperature G at the start time in five hours and the engine oil temperature G2 at the termination time is smaller than the second reference temperature C, it is determined that the engine coolant temperature and the engine oil temperature that need to be converged to the changed outside air temperature are not normally changed and it is determined that the engine off time of the timer has an error.

That is, when the engine coolant temperature and the engine oil temperature are not changed to be converged to the outside air temperature during the engine off time, inversely, it may be determined that the engine off time is incorrectly monitored, and thus it is determined that the engine off time of the timer has an error.

In the meantime, as the result of the comparison in operation S107, when the difference between the absolute values of the outside air temperature K1 and the outside air temperature K2 is smaller than the reference value M, the engine coolant temperature F2 and the engine oil temperature G2 checked at the termination time of the monitoring of the engine off time by the timer are compared with the outside air temperature K2 (S111).

In this case, the case where the difference between the absolute values of the outside air temperature K1 and the outside air temperature K2 is smaller than the reference value M means that the outside air temperature is not changed, so that the comparison of the engine coolant temperature F2 and the engine oil temperature G2 checked at the termination time of the monitoring of the engine off time by the timer in operation S111 with the outside air temperature K2 is for the purpose of determining whether the engine coolant temperature F2 and the engine oil temperature G2 are converged to the outside air temperature K2.

As a result of the comparison in operation S111, when the engine coolant temperature F2 and the engine oil temperature G2 are the same as the outside air temperature K2, it is determined that the engine off time of the timer has no error (S112), and when the engine coolant temperature F2 and the engine oil temperature G2 are not the same as the outside air temperature K2, it is determined that the engine off time of the timer has an error (S110).

That is, when the engine off time monitored by the timer is five hours, the outside air temperature is not changed for five hours, and the engine coolant temperature F2 and the engine oil temperature G2 at the termination time in five hours are converged to the outside air temperature K2, it is determined that the engine off time of five hours monitored by the timer is monitored without an error, but when the engine coolant temperature F2 and the engine oil temperature G2 at the termination time in five hours are not converged to the outside air temperature K2, it is determined that the engine off time is incorrectly monitored and it is determined that the engine off time by the timer has an error.

In order to more accurately determine whether the engine off time by the timer is properly monitored, an operation of comparing the fuel tank pressure H2 and the fuel tank temperature I2 checked at the termination time of the monitoring of the engine off time with reference values Y1 and Y2 for each outside air temperature may be further included in operation S111.

Figure 4:
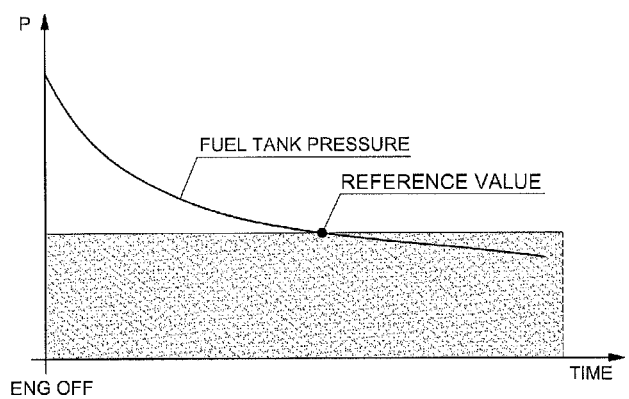
FIG. 4 is a graph illustrating a decrease in pressure of a fuel tank after engine start off.

Referring to FIG. 4, it can be seen that the fuel tank pressure is decreased while gradually being converged to the outside air temperature at the engine off (key off) time, and further, the fuel tank temperature is also decreased while gradually being converged to the outside air temperature at the engine off (key off) time.

In operation S111, the fuel tank pressure H2 and the fuel tank temperature I2 are further compared with the reference values Y1 and Y2 for each outside air temperature, respectively, in addition to the comparison of the engine coolant temperature F2 and the engine oil temperature G2 with the outside air temperature K2, and when the fuel tank pressure H2 and the fuel tank temperature I2 are smaller than the reference values Y1 and Y2 for each outside air temperature, respectively, it is determined that the fuel tank pressure H2 and the fuel tank temperature I2 are converged to the outside air temperature and it is determined that the engine off time of the timer has no error (S112), and otherwise, it is determined that the engine off time of the timer has an error (SI 10).

In this case, as represented in Table 1 below, the pressure value Y1 may be set as the reference value Y1 for determining that the fuel tank pressure is converged to the outside air temperature for each outside air temperature, and the temperature value Y2 for each outside air temperature may be set as the reference value Y2 for each outside air temperature.

TABLE 1

| | Outside air temperature (° C.) | | | | | | | | | | |
|---|---|---|---|---|---|---|---|---|---|---|---|
| | −40 | −30 | −20 | −10 | 0 | 10 | 20 | 30 | 40 | 50 | 60 |
| Presssure for each outside air temperature (bar) | 0.8 | 1 | 2 | 3 | 5 | 6 | 7 | 8 | 9 | 10 | 11 |

As described above, in operation S111, the fuel tank pressure H2 and the fuel tank temperature I2 are further compared with the reference values Y and Y2 for each outside air temperature in addition to the comparison of the engine coolant temperature F2 and the engine oil temperature G2 with the outside air temperature K2, so that it is possible to more accurately determine whether the engine off time by the timer is properly monitored.

In the meantime, as a result of the comparison in operation S106, when the engine off time is shorter than the upper limit reference time X, it is determined again whether the engine off time is equal to or longer than a lower limit reference time Z (for example, a time shorter than five hours and equal to or longer than one hour) (S113).

When the engine off time is shorter than the upper limit reference time X and is equal to or longer than the lower limit reference time Z, the differences between the engine coolant temperature F1 and the engine oil temperature G1 stored at the initiation time of the monitoring of the engine off time by the timer and the engine coolant temperature F2 and the engine oil temperature G2 checked at the termination time of the monitoring of the engine off time by the timer are compared with reference temperatures (SI 14).

When the engine off time monitored by the timer is shorter than the upper limit reference time X and is equal to or longer than the lower limit reference time Z (for example, a time between one hour to five hours), the engine coolant temperature and the engine oil temperature are not in a soaking state in which the engine coolant temperature and the engine oil temperature are converged to the outside air temperature, so that the engine coolant temperature and the engine oil temperature are not converged to the outside air temperature, but the coolant temperature and the oil temperature of the engine from the previous engine start off (key off) time to the next engine start on (key on) time need to be actually decreased by the first reference temperature B and the second reference temperature C, respectively.

That is, during the engine off time of the timer monitored from the previous engine start off (key off) time to the next engine start on (key on) time, the engine coolant temperature needs to be decreased by the first reference temperature B and the engine oil temperature needs to be decreased by the second reference temperature C.

Accordingly, when a temperature obtained by subtracting the engine coolant temperature F2 checked at the termination time of the monitoring of the engine off time from the engine coolant temperature F1 stored at the initiation time of the monitoring of the engine off time by the timer is larger than the first reference temperature and a temperature obtained by subtracting the engine oil temperature G2 checked at the termination time of the monitoring of the engine off time from the engine oil temperature G1 stored at the initiation time of the monitoring of the engine off time by the timer is larger than the second reference temperature, it is determined that the engine off time of the timer has no error (S115).

In the meantime, when the temperature obtained by subtracting the engine coolant temperature F2 checked at the termination time of the monitoring of the engine off time from the engine coolant temperature F1 stored at the initiation time of the monitoring of the engine off time by the timer is smaller than the first reference temperature and a temperature obtained by subtracting the engine oil temperature G2 checked at the termination time of the monitoring of the engine off time from the engine oil temperature G1 stored at the initiation time of the monitoring of the engine off time by the timer is smaller than the second reference temperature, it is determined that the engine off time of the timer has an error (S117).

In the meantime, as a result of the determination in operation S113, when the engine off time is shorter than the upper limit reference time X and is shorter than the lower limit reference time Z (for example, a time shorter than one hour), the differences between the engine coolant temperature F1 and the engine oil temperature G1 stored at the initiation time of the monitoring of the engine off time by the timer and the engine coolant temperature F2 and the engine oil temperature G2 checked at the termination time of the monitoring of the engine off time by the timer are compared with the reference temperatures like operation S114 (S116).

In this case, when the engine off time is shorter than the upper limit reference time X and is shorter than the lower limit reference time Z (for example, a time shorter than one hour), the engine coolant temperature and the engine oil temperature are not in a soaking state in which the engine coolant temperature and the engine oil temperature are changeable according to the outside air temperature, so that the engine coolant temperature and the engine oil temperature need not to be changed to the reference temperature or higher during the engine off time.

More particularly, when the engine off time is shorter than the upper limit reference time X and is shorter than the lower limit reference time Z (for example, a time shorter than one hour), the engine coolant temperature and the engine oil temperature are not in the soaking state in which the engine coolant temperature and the engine oil temperature are changeable according to the outside air temperature, so that a value obtained by subtracting the engine coolant temperature F2 at the termination time of the monitoring of the engine off time (the next engine start on time) by the timer from the engine coolant temperature F1 at the initiation time of the monitoring of the engine off time (the engine start off time) by the timer needs to be smaller than the first reference temperature B, and the engine oil temperature G1 at the initiation time of the monitoring of the engine off time (the engine start off time) by the timer needs to be lower than the engine oil temperature G2 at the termination time of the monitoring of the engine off time (the next engine start on time) by the timer.

Accordingly, as a result of the comparison in operation S116, when the value obtained by subtracting the engine coolant temperature F2 checked at the termination time of the monitoring of the engine off time by the timer from the engine coolant temperature F1 stored in the electronic control unit ECU at the initiation time of the monitoring of the engine off time by the timer is larger than the first reference temperature B, and the value obtained by subtracting the engine oil temperature G2 checked at the termination time of the monitoring of the engine off time by the timer from the engine oil temperature G1 stored in the electronic control unit ECU at the initiation time of the monitoring of the engine off time by the timer is larger than the second reference temperature C, it is determined that the engine off time of the timer has an error (S117), and otherwise, it is determined that the engine off time of the timer has no error (S118).

As described above, it is accurately determined whether the timer which monitors an engine off time between a previous start off time and a next start on time has an error, that is, whether the timer is properly operated in the actual off state of the electronic control unit ECU, by using an engine coolant temperature, an engine oil temperature, a fuel tank pressure, and a fuel tank temperature, an outside air temperature, and the like.

In the meantime, when it is determined that the engine off time of the timer has an error, an operation of giving a warning (for example, flickering a cluster warning light) recognizable by a driver may be performed to induce a replacement of the timer included in the electronic control unit ECU.

The present disclosure has been described with reference to the exemplary embodiments, but those skilled in the art may understand that the elements of the present disclosure may be corrected and modified within the range without departing from the scope of the present disclosure. Further, special situations or materials may be considerably changed within the scope without departing from the essential area of the present disclosure. Accordingly, the present disclosure is not limited by the detailed description of the exemplary embodiment of the present disclosure, and includes all of the exemplary embodiments within the accompanying claims.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of diagnosing a fault of a timer for monitoring an engine off time, the method comprising:
   i) initiating, by a timer of an electronic control unit, monitoring of an engine off time when an engine starts off;
   ii) storing first data including a fuel tank pressure, a fuel tank temperature, and an outside air temperature including an engine coolant temperature and an engine oil temperature at an initiation time of the monitoring of the engine off time in the electronic control unit;
   iii) terminating the monitoring of the engine off time by the timer when the engine starts on, and providing the monitored engine off time to a calculating unit of the electronic control unit;
   iv) checking, by the electronic control unit, second data including a fuel tank pressure, a fuel tank temperature, and an outside air temperature including an engine coolant temperature and an engine oil temperature at a termination time of the monitoring of the engine off time; and
   v) comparing the first data stored in operation ii) with the second data checked in operation iv) according to the engine off time provided in operation iii), and determining whether the engine off time of the timer provided in operation iii) has an error.

2. The method of claim 1, wherein in operation v), when the engine off time provided in operation iii) is equal to or longer than an upper limit reference time and a difference between absolute values of the outside air temperature stored in operation ii) and the outside air temperature checked in operation iv) is larger than a reference value, a temperature obtained by subtracting the engine coolant temperature checked in operation iv) from the engine coolant temperature stored in operation ii) is higher than a first reference temperature, and a temperature obtained by subtracting the engine oil temperature checked in operation iv) from the engine oil temperature stored in operation ii) is higher than a second reference temperature, it is determined that the engine off time of the timer has no error.

3. The method of claim 1, wherein in operation v), when the engine off time provided in operation iii) is equal to or longer than an upper limit reference time and a difference between absolute values of the outside air temperature stored in operation ii) and the outside air temperature checked in operation iv) is larger than a reference value, a temperature obtained by subtracting the engine coolant temperature checked in operation iv) from the engine coolant temperature stored in operation ii) is lower than a first reference temperature, or a temperature obtained by subtracting the engine oil temperature checked in operation iv) from the engine oil temperature stored in operation ii) is lower than a second reference temperature, it is determined that the engine off time of the timer has the error.

4. The method of claim 1, wherein in operation v), when the engine off time provided in operation iii) is equal to or longer than an upper limit reference time and a difference between absolute values of the outside air temperature stored in operation ii) and the outside air temperature checked in operation iv) is smaller than a reference value, and the engine coolant temperature and the engine oil temperature checked in operation iv) are the same as the outside air temperature, it is determined that the engine off time of the timer has no error, and otherwise, it is determined that the engine off time of the timer has the error.

5. The method of claim 4, wherein the determining whether the engine off time of the timer has the error further includes determining that the engine off time of the timer has no error when the fuel tank pressure and the fuel tank temperature checked in operation iv) are smaller than reference values for each outside air temperature, and determining that the engine off time of the timer has the error otherwise.

6. The method of claim 1, wherein in operation v), when the engine off time provided in operation iii) is shorter than an upper limit reference time and is equal to or longer than a lower limit reference time, a temperature obtained by subtracting the engine coolant temperature checked in operation iv) from the engine coolant temperature stored in operation ii) is higher than a first reference temperature, and a temperature obtained by subtracting the engine oil temperature checked in operation iv) from the engine oil temperature stored in operation ii) is higher than a second reference temperature, it is determined that the engine off time of the timer has no error.

7. The method of claim 1, wherein in operation v), when the engine off time provided in operation iii) is shorter than an upper limit reference time and is equal to or longer than a lower limit reference time, and a temperature obtained by subtracting the engine coolant temperature checked in operation iv) from the engine coolant temperature stored in operation ii) is lower than a first reference temperature, and a temperature obtained by subtracting the engine oil temperature checked in operation iv) from the engine oil temperature stored in operation ii) is lower than a second reference temperature, it is determined that the engine off time of the timer has the error.

8. The method of claim 1, wherein in operation v), when the engine off time provided in operation iii) is shorter than a lower limit reference time, and a temperature obtained by subtracting the engine coolant temperature checked in operation iv) from the engine coolant temperature stored in operation ii) is higher than a first reference temperature, and a temperature obtained by subtracting the engine oil temperature checked in operation iv) from the engine oil temperature stored in operation ii) is higher than a second reference temperature, it is determined that the engine off time of the timer has the error, and otherwise, it is determined that the engine off time of the timer has no error.

9. The method of claim 1, further comprising:
   when it is determined that the engine off time of the timer has the error in operation v), providing a warning recognizable by a driver.

10. A non-transitory computer readable medium containing program instructions executed by a processor, the computer readable medium comprising:
    program instructions that initiate monitoring of an engine off time when an engine starts off;
    program instructions that store first data including a fuel tank pressure, a fuel tank temperature, and an outside air temperature including an engine coolant temperature and an engine oil temperature at an initiation time of the monitoring of the engine off time in an electronic control unit;
    program instructions that terminate the monitoring of the engine off time when the engine starts on, and provide the monitored engine off time to a calculating unit of the electronic control unit;
    program instructions that check second data including a fuel tank pressure, a fuel tank temperature, and an outside air temperature including an engine coolant temperature and an engine oil temperature at a termination time of the monitoring of the engine off time; and program instructions that compare the first data with the second data according to the engine off time, and determine whether the engine off time has an error.

* * * * *